July 16, 1968 W. J. TROTT 3,393,400
CALIBRATION METHOD USING TRANSDUCER ARRAY WITH CONSTANT
PRESSURE PLANE WAVE NEAR-FIELD
Original Filed July 30, 1965 7 Sheets-Sheet 1

INVENTOR
WINFIELD J. TROTT

BY
ATTORNEY

FIG. 2

| fa | ea | da | ca | ba | aa |
| fb | eb | db | cb | bb | ab |
| fc | ec | dc | cc | bc | ac |
| fd | ed | dd | cd | bd | ad |
| fe | ee | de | ce | be | ae |
| ff | ef | df | cf | bf | af |

FIG. 4

| a' | a' | a' | a' | a' | a' |
| b' | b' | b' | b' | b' | a' |
| c' | c' | c' | c' | b' | a' |
| d' | d' | d' | c' | b' | a' |
| e' | e' | d' | c' | b' | a' |
| f' | e' | d' | c' | b' | a' |

INVENTOR
WINFIELD J. TROTT

INVENTOR
WINFIELD J. TROTT

United States Patent Office 3,393,400
Patented July 16, 1968

3,393,400
CALIBRATION METHOD USING TRANSDUCER ARRAY WITH CONSTANT PRESSURE PLANE WAVE NEAR-FIELD
Winfield J. Trott, Orlando, Fla., assignor to the United States of America as represented by the Secretary of the Navy
Original application July 30, 1965, Ser. No. 476,214. Divided and this application Sept. 29, 1967, Ser. No. 671,887
9 Claims. (Cl. 340—5)

A method of obtaining data for the calibration of an electroacoustic transducer from measurements made in the near-field of a transducer array having a constant pressure, plane wave near-field. The individual elements of the array are shaded to produce a constant, plane wave, near-field extending over the aperture of said array. The shading is such that the sensitivities of the elements increase from the extremities of the array toward the center according to the coefficients of a summed binomial probability distribution function.

The invention described herein may be manufactured and used by or for the Government of the United States of America for governmental purposes without the payment of any royalties thereon or therefor.

This application is a division of application Ser. No. 476,214, filed July 30, 1965, for Transducer Array With Constant Pressure, Plane Wave Near Field.

This invention relates to a method of obtaining data for the calibration of an electroacoustic transducer and more particularly to a method where the measurements are made in the near field of an transducer array having a constant pressure, plane wave near-field region.

Where the elements of the array are electroacoustic transducers, the array produces a constant pressure, plane wave near-field. Where the elements are antennae, the array produces a constant electric wave plane field, near field.

The present invention finds particular utility in the calibration of electroacoustic transducers from data obtained by measurements made in the near field of the unknown transducer and will be described with particular reference to such use. However, its utility is not limited thereto. Rather, the shading taught by the present invention can be used anytime that it is desired to obtain an electroacoustic array having a constant pressure, plane wave near-field or an electromagnetic array having a constant electric field, plane wave near-field.

In the calibration of electroacoustic transducers, particularly those for use underwater, much attention has recently been focused on obtaining the calibration data from measurements made in the near field of the unknown transducer so that the inadequate dimensions and nonideal boundaries of existing calibration facilities do not prohibit the use thereof for the calibration of large, low frequency transducers which are becoming increasingly important for both civilian and military purposes. To date, the methods used to obtain the calibration data from measurements made in the near field have required that numerous delicate measurements be made thus requiring that considerable skill be employed and allowing significant room for error.

A general purpose of this invention is to provide an electroacoustic transducer array which can be used in the calibration of electroacoustic transducers in such a manner that all of the known advantages of calibrating electroacoustic transducers from measurements made in the near field are retained while the aforedescribed disadvantages of so calibrating transducers are eliminated. To attain this, the present invention contemplates shading the individual elements of an electroacoustic transducer array so that the array has a constant pressure, plane wave near-field and making the measurements necessary to calibrate the unknown electroacoustic transducer while it is maintained within this constant pressure, plane wave near-field.

An object of the present invention is to provide a simple and accurate method of obtaining the data necessary to calibrate an electroacoustic transducer from measurements made in the near field of the transducer.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1A:
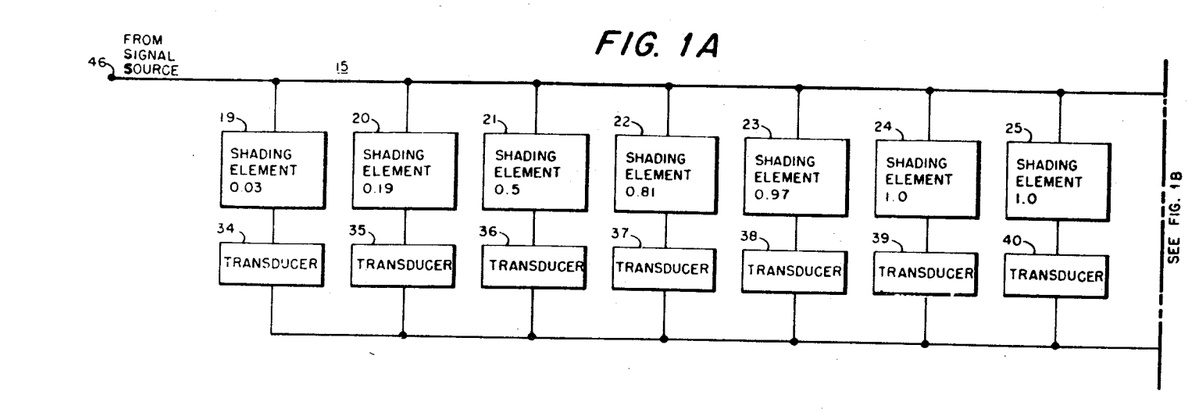
FIGS. 1A and 1B, when taken together, illustrate an electroacoustic line transducer shaded according to the present invention.
Figure 1B:
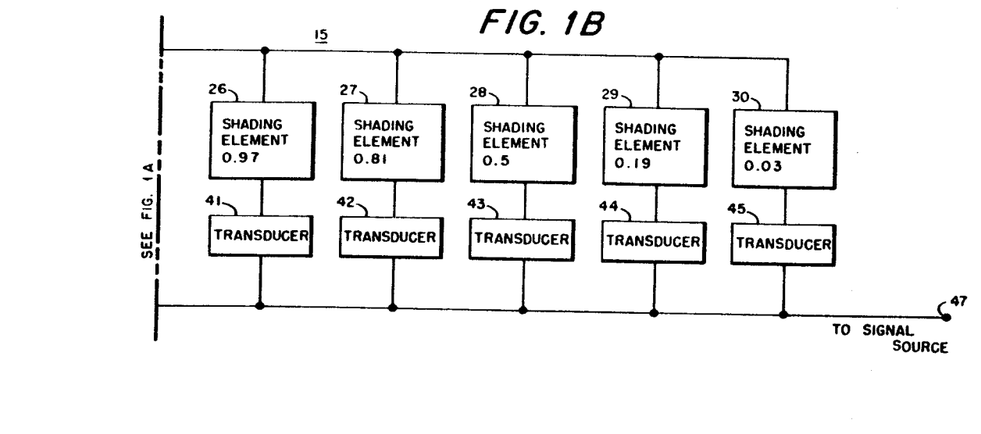

Turning now to FIGS. 1A and 1B which, when viewed together, show a twelve element basic electroacoustic line array 15 shaded according to the present invention. Shading elements 19–30 are respectively coupled in series with parallel energized electroacoustic transducers 34–45. It should be understood that transducers 34–45 can be piezoelectric, magnetostrictive, or variable reluctance types and that shading elements 19–30 can be any type of shading means known in the art to be appropriate to shade the particular type transducer used. For instance, if transducers 34–45 are piezoelectric, shading can be obtained by placing appropriate size capacitors in series with each of the transducers or by etching away part of one or more of the electrodes making electrical contact with the respective transducer. If the transducers are magnetostrictive, shading can be obtained by properly selecting the number of turns in the winding on each of the cores or by varying the amount of magnetostrictive material in each of the cores. These examples are not exhaustive but, rather, illustrate that the shading may be obtained by any means appropriate to control the sensitivity of the individual transducers.

It should be understood that the line array of FIG. 1 could be used as a receiver as well as a transmitter. When operating as a receiver, the output voltage would appear across a load (not shown) connected between terminals 46 and 47.

It is known that if shading in the form of a Gaussian function is used to shade an array, the pressure along the beam axis of the array will be constant in the near field and all minor lobes in the far field directivity of the array will be suppressed. But, shading of this form does not provide the constant pressure, plane wave near-field desired because the pressure falls off rapidly for positions in the aperture of the array that are off the beam axis.

Rather, the instant invention contemplates the use of a shading function that will cause the first minor lobe in the far-field directivity to be attenuated only slightly and all successive minor lobes to be suppressed to a much greater extent. An array so shaded will have a pressure maximum on the beam axis at the far extreme of the near field and a maximum at the array's periphery. Therefore, the pressure will be kept constant over a greater portion of the aperture than when all minor lobes are suppressed as in shading in the form of a Gaussian function.

It has been found that if a line array is symmetrically shaded about the center with the sensitivity of the individual transducers thereof decreasing from the center toward the respective ends thereof according to the values of a binomial probability distribution function, the desired slight attenuation in the first minor lobe and much greater suppression of all subsequent minor lobes in the far-field directivity will be obtained. The values of the binomial probability distribution can be determined from the formula:

$$S = \sum_{x=r}^{n} \binom{n}{r}(0.5)^n \qquad (1)$$

where $s$ = the transducer sensitivity:
$r = 1, 2, \ldots n$; and $$\binom{n}{r} = \frac{n!}{(n-r)!}$$

This formula will be recognized as the formula for determining the probability of at least $r$ occurrences in $n$ independent binomial trials, when the probability in any single trial is 0.5.

When the line array of FIG. 1 is shaded in this manner, the shading elements 19–30 are chosen so that transducers 34–45 have sensitivities of 0.03, 0.19, 0.5, 0.81, 0.97, 1.0, 1.0, 0.97, 0.81, 0.5, 0.19, and 0.03 respectively. These coefficients are obtained by setting $n$ in Equation 1 equal to 5. Of course, $n$ would not have to be equal to 5 but could be any value appropriate to the number of transducers in the array. One of many published tables in which these coefficients are available is: National Bureau of Standards, Applied Mathematics Series No. 6, Tables of the Binomial Probability Distribution, U.S. Government Printing Office, Washington, D.C., 1950. This table gives coefficients for values of $n$ from 2–49.

It should be understood that there is quite a bit of latitude available in adding unshaded transducers (that is, transducers unaffected by any shading so that their normalized sensitivity coefficients are equal to 1.0) in the center of the array without destroying the constant pressure, plane wave near-field. For example, if a fourteen element line array were desired, the individual transducers thereof could have sensitivities from the left to right ends thereof of 0.03, 0.18, 0.5, 0.81, 0.97, 1.0, 1.0, 1.0, 1.0, 0.97, 0.81, 0.5, 0.19 and 0.03 respectively.

It is also possible to derive the coefficients of the shading function of the present function by taking the coefficients of a binomial series having a power equal to $n$ and replicating the coefficients of the series $m$ times where $m = n + c$ and c equals the number of unshaded transducers in the center of the array. For example, the coefficients of the shading function for the line array of FIGS. 1A and 1B are from left to right, 0.03, 0.19, 0.5, 0.81, 0.97, 1.0, 1.0, 0.97, 0.81, 0.5, 0.19 and 0.03. These coefficients represent the normalized result of taking the coefficients of a binomial series having a power $n=5$ and replicating them $m=n+c=7$ times.

The general equation for the directivity of a line array shaded according to the present invention is:

$$P = \frac{\sin m\phi}{m \sin \phi} \cos^n \phi \qquad (2)$$

where $P$ = pressure;

$$\phi = \frac{\pi d}{\lambda} \sin \theta;$$

$d$ = element spacing;
$\gamma$ = the wavelength at which the line is operating; and
$\theta$ = the angle in the plane containing the line and the beam axis of the line between the plane normal to the line which also contains the beam axis and the plane that contains a distant measuring point and intersects the line at the beam axis.

Applying equation 2 to the line array shown in FIG. 1, it is seen that the directivity thereof is:

$$p = \frac{\sin 7\phi}{7 \sin \phi} \cos^5 \phi$$

Solution of this equation shows that the first minor lobe is retained while all subsequent minor lobes are suppressed.

A shading function derived as that for the line array of FIGS. 1A and 1B can be used to determine the shading function that it is necessary to apply to a plane array to have the plane array have the same far-field directivity as that of the line array.

Consider a plane array lying in the Y–Z plane of a rectangular coordinate system with each row of individual transducers thereof being parallel to the Y axis and containing a given number of transducers spaced from one another a distance $d_1$ and with a given number of columns of individual transducers spaced from one another a distance $d_2$ and each column being parallel to the Z axis. Further, consider a line array superimposed over each row and column of the plane array with the line arrays superimposed over the rows containing the same number of transducers as contained in the rows with the transducers in the line arrays spaced from one another the same distance $d_1$ as the transducer in the rows and with the line arrays superimposed over the columns containing the same number of transducers as contained in the columns with the transducers in the line arrays spaced from one another the same distance $d_2$ as the transducers in the columns. Then, it is known that if the transducers of the plane array are shaded so that their respective sensitivities are equal to the product of the sensitivities of the two transducers superimposed thereover, the plane array will have approximate circular symmetry and a far-field directivity the same as that of the shaded line arrays.

Figure 2:
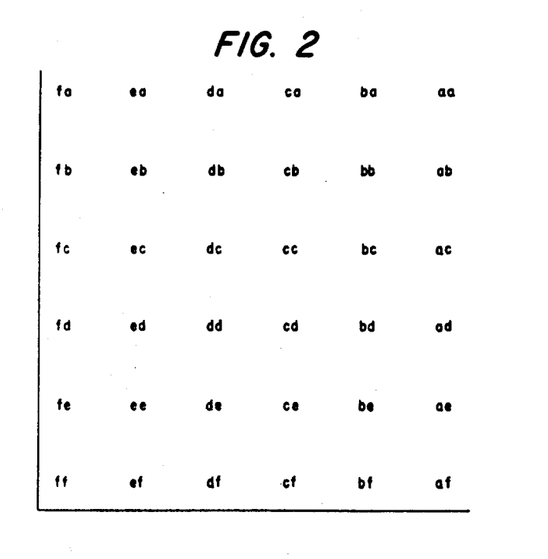
FIG. 2 illustrates the shading of one quadrant of a plane array having approximate circular symmetry.

Thus, if the shading function for the line array of FIGS. 1A and 1B is represented, from left to right, by $a, b, c, d, e, f, f, e, d, c, b, a$ the individual transducers for a twelve by twelve plane array having approximate circular symmetry and the same directivity as that of the line array would have sensitivities as shown for the upper right quadrant of such an array in FIG. 2. As is obvious from the above, if the identically shaded line arrays used to derive the shading function for the plane array have constant pressure, plane wave near-fields, the plane array will also have a constant pressure, plane wave near-field.

Figure 3:
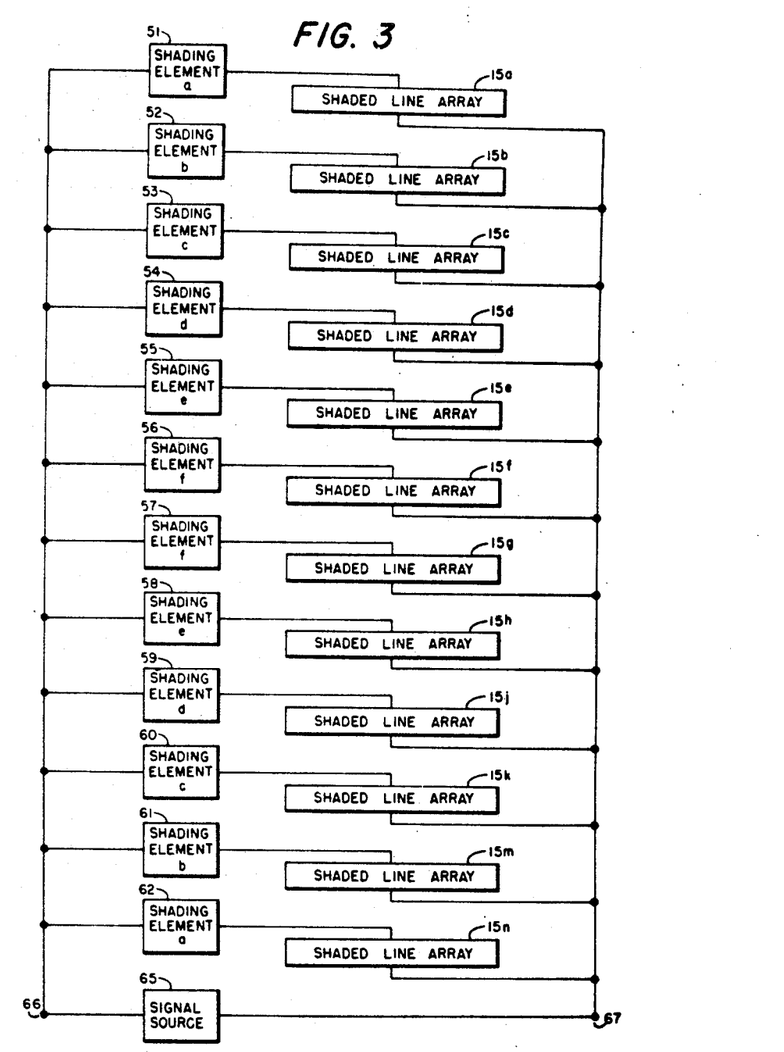
FIG. 3 represents a plane array having approximate circular symmetry and being shaded according to the present invention.

FIG. 3 represents a typical embodiment of a twelve by twelve plane array having approximate circular symmetry of shading elements and being shaded according to the present invention. Line arrays 15a–15h, 15j, 15k, 15m, and 15n are all shaded identically to each other and to line array 15 of FIGS. 1A and 1B. For convenience of expression, the 0.03, 0.19, 0.5, 0.81, 0.97, 1.0, 1.0, 0.97, 0.81, 0.5, 0.19, 0.03 shading coefficients of line array 15 of FIGS. 1A and 1B and 15a–15h, 15j, 15k, 15m, and 15n and of FIG. 3 are respectively represented by $a, b, c, d, e, f, f, e, d, c, b, a$.

Shading elements 51–62 are connected in series with the inputs to line arrays 15a–15h, 15j, 15k, 15m, and 15n respectively and have shading coefficients of $a, b, c, d, e, f, f, e, d, c, b, a$ respectively. Thus, the effective shading of each of the transducers will be the product of the shading coefficient of the shading element connected in series with the input to the line array containing the transducer and of the shading coefficient of the shading element within the line array that is connected in series with the input to the transducer. For example, the effective shading of the individual transducers within line array 15a will be, from left to right, aa, ab, ac, ad, ae, af, af, ae, ad, ac, ab, aa.

When the plane array of FIG. 3 is operating in a transmitting mode, signal source 65 will impress an input signal across terminals 66 and 67. When the array is operating in a receiving mode, the output voltage will appear across a load (not shown) connected between terminals 66 and 67.

It should be clear that FIG. 3 does not represent the only possible embodiment of a plane array having approximate circular symmetry. Rather, such an array could be composed of any type of electroacoustic transducer and any shading appropriate to the transducer used. However, it will be noted that the sensitivities of the individual elements in the plane array all satisfy the equation:

$$S = S_1 S_2 \tag{3}$$

where $S=$ the sensitivity of a transducer in the plane array:

$S_1=$ the sensitivity of the transducer in a first line array which occupies the same position with respect to the other transducers in said first line array as said transducer of the plane array occupies with respect to the other transducers of the row of said plane array in which it is included, said first line array containing the same number of transducers as contained within said row being spaced identically to said transducers in said row, the sensivities of the transducers in said first line array being shaded so as to increase from the extremities toward the center thereof according to the coefficients of a binomial probability distribution function; and $s_2=$ the sensitivity of the transducer in a second line array which occupies the same position with respect to the other transducers in said second line array as said transducer of said plane array occupies with respect to the other transducers of the column of the plane array in which it is included, said second line array containing the same number of transducers as contained within said column being spaced identically to the transducers in said column, the sensitivities of the transducers in said second line array being shaded so as to increase from the extremities toward the center thereof according to the coefficients of a binomial probability distribution function.

Figure 4:
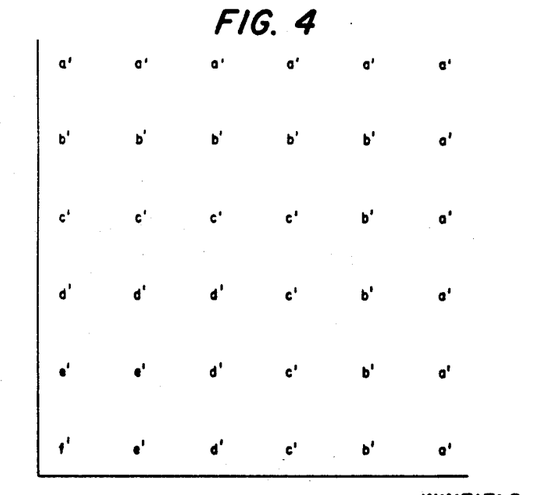
FIG. 4 illustrates the shading of one quadrant of a plane array having square symmetry.

FIG. 4 represents the sensitives of the transducers of a plane array having square symmetry wherein the plane array is shaded according to the present invention. Only the upper-right quadrant is shown. However, it can be seen from FIG. 4 that the full array has families of rectangular, or more particularly, square, groups of transducers having the same sensitivities with the groups so arranged that each transducer lies in a horizontal row and a vertical column of transducers. Furthermore, it can be seen from FIG. 4 that the groups are so arranged that the perpendicular bisectors of the sides of the rectangles that are defined by the transducers having the same sensitivity all meet at a common point.

In order that Equation 2 represent the far-field directivity of the plane array having square symmetry, it is necessary to derive new shading coefficients. These coefficients can be derived from the shading coefficients of a line array such as that of FIGS. 1A and 1B. Equation 2 represents the directivity of a plane array having square symmetry if the shading coefficient for the $j_p$ group of transducers in the plane array satisfy the equation:

$$s_{j_p} = \frac{1}{n_{j_L}} s_{j_L} - \sum_{x=j_L+1}^{t_L} \frac{1}{n_x(n_x-1)} s_x \tag{4}$$

where $j_p$ identifies any one of the groups by the number of groups said one of said groups is removed from said common point and $=1, 2, 3 \ldots t_p$;
$t_p=$ the total number of groups;
$S_{j_p}=$ the sensitivity of the transducers in the $j_p$ group;
$j_L$ identifies any one of the transducers in said line array by the number of transducers said one of said transducers is removed from the center of said line array and $=j_p$;
$n_{j_L}=$ the number of transducers the $j_L$ transducer is removed from the center of said line array;
$S_{j_L}=$ the sensitivity of the $j_L$ transducer;
$t_L=$ one-half the total number of transducers in said line array;
X identifies any one of the transducers in said line array;
$n_x=$ the number of transducers the $x$ transducer is removed from the center of said line array; and
$S_x=$ the sensitivity of the $x$ transducer.

Figure 5A:
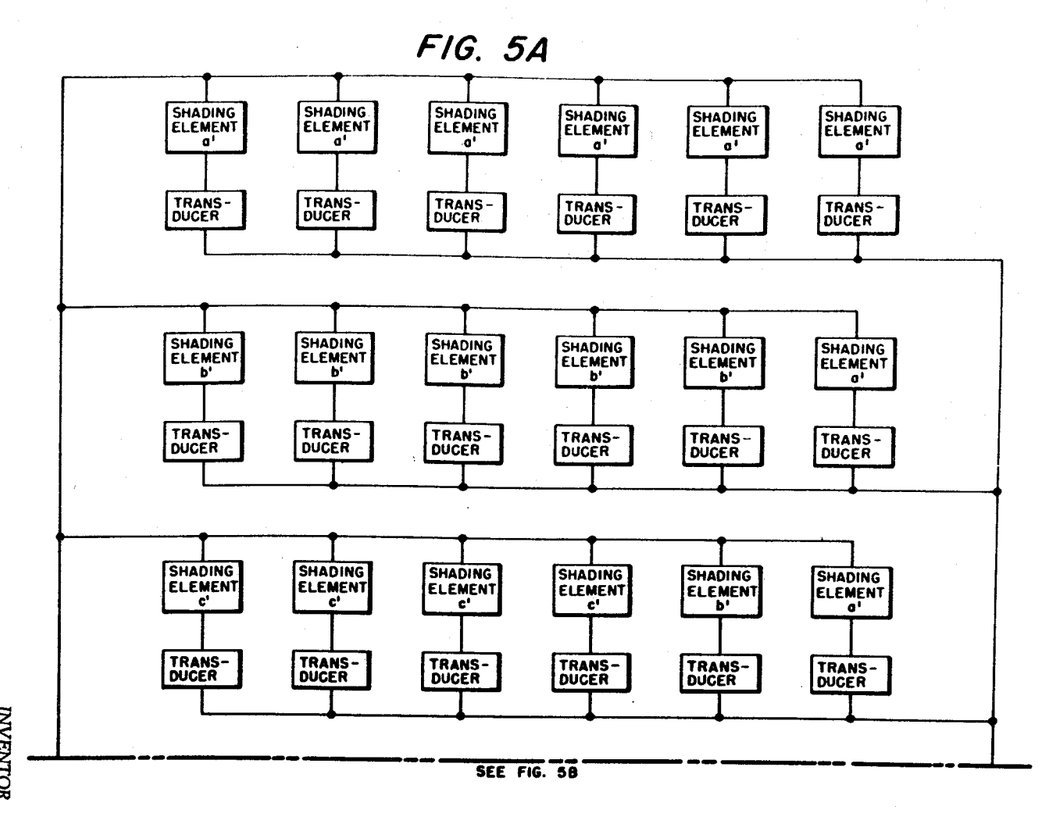
FIGS. 5a and 5b, when viewed together, show one quadrant of a plane array having square symmetry.
Figure 5B:
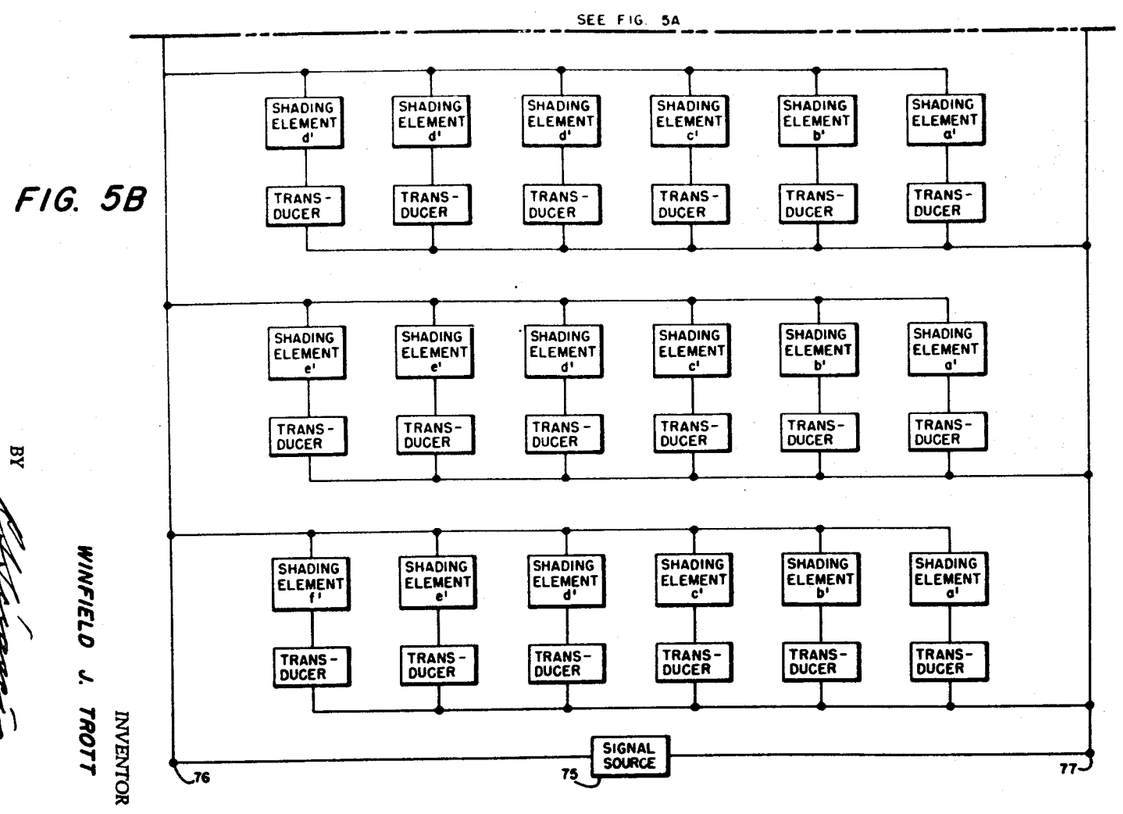

FIGS. 5a and 5b, when viewed together, show the right quadrant of a 12 by 12 plane array having square symmetry and being shaded according to the present invention. As shown, the shading is achieved by placing appropriate sized shading elements in series with each of the transducers. Such an arrangement would obtain where the shading elements are capacitors and the transducers are piezoelectric elements. However, it should be understood that the present invention is not limited to the use of piezoelectric transducers or series capacitor shading but, rather, may be used in conjunction with any type transducer and appropriate means to control the sensitivity of the transducer used.

As shown in FIGS. 5a and 5b, the array is connected so as to operate in a transmitting mode with signal source 75 impressing an input voltage across terminals 76 and 77. However, the array could also be used in a receiving mode in which case signal source 75 would be removed and the output voltage would appear across a load (not shown) connected between terminals 76 and 77.

There are a set of conditions pertaining to the upper and lower operating frequency limitations that the line array, plane array having circular symmetry, and plane array having square symmetry all must satisfy if they are to produce a constant pressure, plane wave near-field. To express this set of conditions, it is necessary to define a radius R as being ½ the distance between the points each side of center of the line array around which a symmetry exists with respect to the sensitivities of the transducers on the respective sides of the center whose sensitivities are affected by the shading. For example, the shading of the basic shaded line array of FIGS. 1A and 1B is, from left to right, 0.03, 0.19, 0.5, 0.81, 0.97, 1.0, 1.0, 0.97, 0.81, 0.5, 0.19, 0.03. It can be seen that the shading does not affect the transducers having sensitivities of 1.0 and that there is a symmetry of shaded elements on the respective sides of the center around the elements shaded to 0.5. Thus, if each element is considered to be spaced from the adjacent element a distance $d$, ½ the distance between the shaded elements around which symmetry of shaded elements exists would be equal to ½ the distance between the elements shaded to 0.5 which would equal to $7d/2$.

Then, the upper and lower operating frequency conditions can be expressed as:

$$d/0.8 \leq \lambda \leq R/1.2 \tag{5}$$

where $d=$ spacing between individual transducers in the line array;
$\lambda=$ the wavelength of the operating frequency; and
$R=$ ½ the distance between the points each side of the center of the line array around which a symmetry exists with respect to the sensitivities of the transducers on the respective sides of said center whose sensitivities are affected by said shading.

A computation of the relative pressure vs. frequency at the center of an array having circular symmetry shows the greatest pressure amplitude variation that will exist whether the array has approximate circular or square symmetry provided that both arrays are derived from the same basic shaded line.

An array having approximate circular symmetry can be considered to a piston of unity source strength density with a radius equal to R (which was defined above to be ½ the distance between the shaded elements of the basic line array around which symmetry of shaded elements exists) with shading superimposed on this piston by the addition of ring sources.

The relative near-field pressure at the center of an unshaded piston of unity source strength density is given by:

$$p = 2 \sin \tfrac{1}{2} kR \exp i(\omega t + \tfrac{1}{2}\pi - \tfrac{1}{2} kR) \quad (6)$$

where $k = 2\pi/\lambda$;
$\lambda$ = the wavelength of the operating frequency of the piston;
$R$ = the radius of the piston; and
$\omega$ = the operating frequency of the piston in rad/sec.

The relative near-field pressure at the center of a ring source is given by:

$$p = 2 w_1 \sin \tfrac{1}{2} kd \exp i(\omega t + \tfrac{1}{2}\pi - kR_1) \quad (7)$$

where $W$ = the source strength density of the ring;
$k = 2\pi/\lambda$;
$\lambda$ = the wavelength of the operating frequency;
$d$ = the width of the ring source;
$\omega$ = the operating frequency of the ring source in rad/sec. and
$R_1$ = the average radius of the ring source.

From Equations 6 and 7 it is possible to compute the relative pressure at the center of a plane array having approximate circular symmetry. For example, the plane array of FIG. 3, which was derived from the basic shaded line array of FIGS. 1A and 1B, can be represented by a piston having unity source strength density and a radius equal to the distance between the center of the line array and the element of 0.5 source strength density with five ring sources, each of a width $d$ equal to the distance between adjacent elements in the basic line array, superimposed thereon. The first ring has a source strength density of −0.03 and an average radius $R_1$ equal to the distance from the center of the line array to the element of source strength density equal to 0.97 in the line array; the second has a source strength density of −0.19 and an average radius $R_1$ equal to the distance from the center of the line array to the element of source strength density equal to 0.81; the third has a source strength density of 0.5 and an average radius $R_1$ equal to the distance from the center of the line array to the element of source strength density equal to 0.5; the fourth has a source strength of 0.19 and an average radius $R_1$ equal to the distance from the center of the line array to the element of source strength density equal to 0.19; and the fifth has a source strength density of 0.03 and an average radius $R_1$ equal to the distance from the center of the line array to the element of source strength density equal to 0.03.

When ring sources of source strength densities of ½, ±$W_1$, ±$W_2$, ±$W_3$, etc., are superimposed on a piston with a radius R and unity source strength density, the pressure at the center for half of the ring sources, $n$ odd, including the ring with a source strength density of ½ and radius R, is given by:

$$p = \sin kR + i(\cos \tfrac{1}{2} kd - \cos kr$$
$$-4w_1 \sin \tfrac{1}{2} kd \sin kd$$
$$-4w_2 \sin \tfrac{1}{2} kd \sin 2kd - 4w_3 \sin \tfrac{1}{2} kd \sin 3kd$$
$$- \ldots ) \quad (8)$$

The remaining half of the ring sources $n$ even, will include no ring of source strength density ½ and radius R. For this remaining half, R is defined as the distance from the common center of the rings to a point half way between the ring with a source strength density greater than ½ and the ring with a source strength density less than ½ and the relative pressure at the center of these rings is given by:

$$p = \sin kR + i[1 - \cos kR - 4w_1 \sin \tfrac{1}{2} kd \sin \tfrac{1}{2} kd$$
$$-4w_2 \sin \tfrac{1}{2} kd \sin 3(\tfrac{1}{2} kd) - 4w_3 \sin \tfrac{1}{2} kd \sin 5(\tfrac{1}{2} kd)$$
$$- \ldots ] \quad (9)$$

It will be observed that Equations 8 and 9 are based on a stepped density distribution rather than a point density distribution. However, this distribution is valid for a square array having approximate circular symmetry.

Using Equation 8 or 9 it is possible to compute the relative sound pressure vs. frequency at the center of an array having approximate circular symmetry. In the example involving the array having approximate circular symmetry of FIGS. 2 and 3, which was derived from the basic shaded line array of FIGS. 1A and 1B, $w_1$ and $w_2$ of Equations 8 and 9 are equal to 0.19 and 0.03 respectively.

Figure 6:
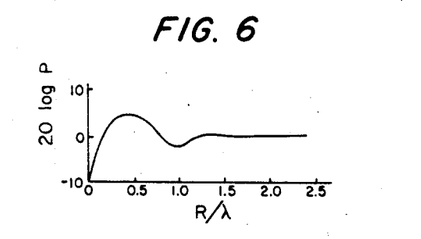
FIG. 6 is an optimum plot of the relative sound pressure at the center of an array having approximate circular symmetry vs. frequency with the plot normalized for any size array.

FIG. 6 is an optimum plot of Equations 8 and 9. The abscissa is normalized in terms of R so that the plot applies to any size array having approximate circular symmetry which is shaded according to the present invention. FIG. 6 can be used to determine the optimum shading function for any array whether the array be a line array or a plane array having approximate circular or square symmetry. This can be done by shading a plane array having approximate circular symmetry according to a binomial probability distribution function and then adding or taking away unshaded elements from the center of the array until a plot of Equations 8 and 9 approximately yields the curve of FIG. 6. The line array can then be obtained from the plane array having approximate circular symmetry through the application of Equation 3 and the plane array having square symmetry can be derived from the line array through the application of Equation 4.

Measurements show the diameter of the aperture for a constant pressure, plane wave near-field is approximately the distance between the transducers having normalized sensitivities of approximately 0.8 and that the axial depth of the constant pressure, plane wave near field is approximately $R^2/\lambda$, where R equals the distance from the center of the basic line array to the shaded element one side of said center around which symmetry of shaded elements the same side of center exists and $\lambda$ equals the wave length of the operating frequency of the $a$ array.

When it is desired to apply the present invention in the field of electroacoustics, the line array, plane array having circular symmetry, and plane array having square symmetry can all be constructed in any of the manners commonly used in the electroacoustic transducer art. For example, the individual elements may be mounted in oil-filled tubing or molded into rubber or plastic jackets and mounted according to conventional practice. Often it is desirable to obtain electrical shielding. This can be done in any way well known in the art such as by mounting the array between wire screens.

It should be understood that the showing of 12 by 12 plane arrays in FIGS. 3 and 4 is not meant to constitute a limitation upon the scope of this invention. There is no necessity that the number of transducers in the rows equal the number of transducers in the columns for an array could be rectangular in shape with one set of binomial probability distribution coefficients along the rows and another set along the columns.

If an electroacoustic transducer array shaded according to the present invention is to be used as a measuring array to calibrate unknown electroacoustic transducers, the array must be acoustically transparent. This is accomplished by maintaining the operating frequency at least one octave below the resonant frequency of the individual transducers of the array and by making each of these transducers small in comparison to the wavelength of the operating frequency.

Also, the array must be calibrated, meaning that the free-field voltage sensivity M, the near-field transmitting current response $s_p$, and the ratio of the free-field voltage sensitivity to the effective area of the array $M/A$ must be determined.

Within the range of frequencies, 4 kc.–12 kc., in which the array of the present invention is of particular interest for calibration, the free-field voltage sensitivity M is the same as the free-field voltage sensitivity of the individual elements of the array.

The near-field transmitting current response of the array, $S_p$, can be measured by placing a calibrated transducer in the near field of the array and operating the transducer in its receiving mode and the array in its transmitting mode. Then:

$$S_p = E_s/M_s I \qquad (10)$$

where $E_s$ = the open circuit output voltage of the calibrated transducer;

$M_s$ = the free-field voltage sensitivity of the calibrated transducer; and $I$ = the current driving the array.

$S_p$ can also be expressed in terms of the far-field voltage sensitivity of the array, M, and the plane-wave reciprocity parameter $J_p$. By definition $$J_p = 2A/\rho c \qquad (11)$$

where $A$ = the effective area of the array, and $\rho c$ = the characteristic impedance of the environment.

Then, $$S_p = M/J_p = (\rho c/2A) \qquad (12)$$

$M_s$ can be expressed in terms of the far-field transmitting current response, $S_s$, of the calibrated transducer and the spherical wave reciprocity parameter $J_s$. By definition, $$J_s = 2D\lambda/\rho c \qquad (13)$$

where $D$ = the reference distance for the far-field transmitting current response;

$\lambda$ = the wavelength of the operating frequency; and $\rho c$ = the characteristic impedance of the environment.

Then, $$M_s = S_s J_s = S_s(2D\lambda/\rho c) \qquad (14)$$

Substituting Equations 12 and 14 into Equation 10 yields, $$M(\rho c/2A) = E_s \rho c/2 S_s D\lambda I \qquad (15)$$

The ratio $E_s/I$ is the transfer impedance between the calibrated transducer when operating as a receiver and the array when operating as a transmitter. When the transducer is operating as a transmitter and the array is operating as a receiver, the transfer impedance is $E/I_s$, where E equals the open circuit output voltage of the array and $I_s$ equals the current driving the calibrated transducer.

Since the acoustical reciprocity theorem applies, $$E_s/I = E/I_s \qquad (16)$$

Substituting Equation 16 into Equation 15 and solving for the ratio $M/A$ yields:

$$\frac{M}{A} = \frac{E}{I_s S_s} \frac{1}{D\lambda} \qquad (17)$$

The sound pressure represented by the product $I_s S_s$ can be measured by means of a calibrated hydrophone placed in the far field of the small calibrated transducer when operating in its transmitting mode since $$I_s S_s = E_h/M_h \qquad (18)$$

where $E_h$ = the open circuit output voltage of the calibrated hydrophone, and $M_h$ = the free-field sensitivity of the calibrated hydrophone.

In practice, only the measurements represented by Equations 17 and 18 need, in fact, be made. These measurements provide all the information necessary to determine the near-field transmitting current response, $S_p$, and the ratio of the free-field voltage sensitivity M to the effective area A.

When an array having a constant pressure, plane wave near-field is calibrated, it can be used to calibrate any unknown transducer whose volume is smaller than that of the constant pressure, plane wave near-field of the array.

Figure 7:
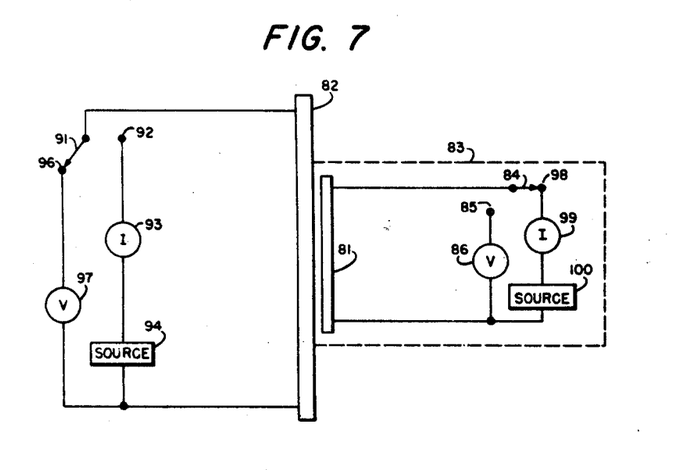
FIG. 7 illustrates the method of using the array of the present invention to calibrate an unknown transducer.

FIG. 7 illustrates a method of obtaining the data to calibrate an unknown transducer 81 through the use of a calibrated array 82 incorporating the present invention so as to have a constant pressure, plane wave near-field. The only limitations upon the use of array 82 to calibrate an unknown transducer 81 are that the volume of transducer 81 be no greater than the volume 83 of the constant pressure, plane wave near-field of array 82, that the unknown 81 be substantially within this constant pressure, plane wave near-field, and that the operating frequency of unknown 81 be within the range of operating frequencies of array 82. Thus, it is clear that an array shaded according to the instant invention may be designed to calibrate most any size transducer.

As an approximation, the volume represented by 83 can be considered to have a diameter equal to the distance between the transducers in the basic shaded line array having sensitivities of approximately 0.8 and to extend to a distance from the face of array 82 of $R^2/\lambda$ where R equals the distance from the center of the basic line array to the shaded element one side of center of the basic line array around which symmetry of shaded elements on that side of center exists and $\lambda$ equals the wavelength of the operating frequency of the array.

The free-field voltage sensitivity $M_x$ of unknown transducer 81 is given by $$M_x = E_x/S_p I \qquad (19)$$

where $E_x$ = the open circuit output voltage of the unknown;

$S_p$ = the near-field transmitting current response of the array; and $I$ = the current driving the array.

The measurements necessary to determine $M_x$ can be made in the embodiment shown in FIG. 7 by putting switch 84 in contact with terminal 85 so that voltmeter 86 will read $E_x$ and by putting switch 91 in contact with terminal 92 so that ammeter 93 will read the driving current I supplied by source 94. $S_p$ is determined in the calibration of array 82.

The far-field transmitting current response of the unknown transducer 81, $S_{s_x}$, can be mathematically derived from the near-field transmitting current of the unknown $S_{p_x}$, the plane wave reciprocity parameter $J_p$, and the spherical wave reciprocity parameter $J_s$.

With the unknown 81 operating as a source and the calibrated array 82 operating as a receiver, the near-field transmitting current response of the unknown is given by $$S_{p_x} = p/I_x$$

Where $p$ = the average sound pressure produced by the unknown which is measured by the array; and $I_x$ = the current driving the unknown.

Since the average pressure $p$ exists over an effective area $A_x$ which is less than the effective area $A$ of the array, the pressure measured by the array is $$p = (E/M)(A/A_x)$$

where $E$ = the output voltage of the array; and
$M$ = the free-field voltage sensitivity of the array.

Therefore, $$S_{p_x} = (E/MI_x)(A/A_x) \quad (20)$$

The far-field transmitting current responses $S_{s_x}$ of the unknown is related to the near-field transmitting current response $S_{p_x}$ by the ratio of the plane-wave reciprocity parameter $J_p$ to the spherical-wave reciprocity parameter $J_s$.

Thus, $$S_{s_x} = EA/MI_x D \quad (21)$$

where $E$ = the open circuit output voltage of the array;
$A$ = the effective area of the array;
$M$ = the free-field voltage sensitivity of the array;
$I_x$ = the driving current of the unknown;
$D$ = the reference distance (generally 1M); and
$\lambda$ = the wavelength of the operating frequency.

The measurements necessary to determine $S_{s_x}$ can be made in the embodiment shown in FIG. 7 by putting switch 91 in contact with terminal 96 so that voltmeter 97 will read $E$ and by putting switch 84 in contact with terminal 98 so that ammeter 99 will read the driving current $I_x$ supplied by source 100. $M$ and $A$ are determined in the calibration of the array and $D$ is generally 1M.

The directivity of the unknown transducer 81 can also be determined by measurements made in the near-field. Since the acoustical reciprocity principle applies, the directivity of the unknown can be measured by operating it as a source and the array as a receiver and by making point by point measurements of the sound pressure incident upon the calibrated array as the unknown transducer is rotated in such a manner that its beam axis is rotated through 360° while being maintained in the horizontal plane which contains the beam axis of the array.

Other acoustic parameters of the unknown 81, such as source level, transmitting voltage response, and transmitting power response, can also be determined from measurements made in the constant pressure, plane wave near-field of the array 82.

Figure 8:
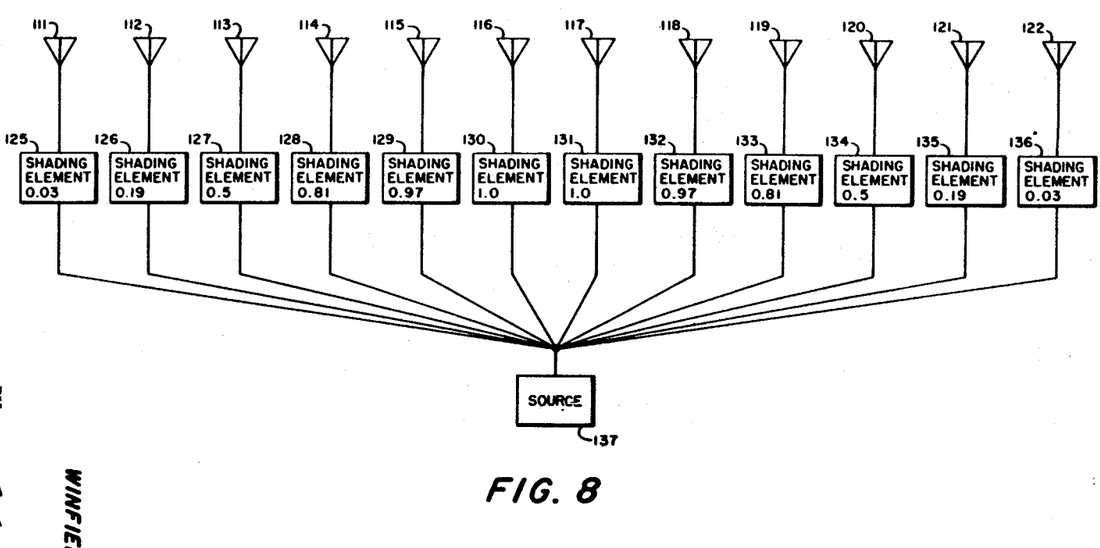
FIG. 8 shows an antenna line array shaded according to the instant invention.

FIG. 8 illustrates how the present invention may be applied to an antenna array. A line array comprising dipoles 111–122 is shown. However, it should be understood that the present invention could be applied to a plane antenna array since the antenna array is analogous to the transducer array.

Dipoles 111–122 are respectively fed in parallel from source 137 through shading elements 125–136. Shading elements 125–136 may be coils or any of the other known means of controlling the sensitivity of a dipole. As shown, the shading function for the 12 element antenna line array is, from left to right, 0.03, 0.19, 0.5, 0.81, 0.97, 1.0, 1.0, 0.97, 0.81, 0.5, 0.19, 0.03 which will be recognized as the same shading function as that for the 12 element transducer line array shown in FIGS. 1A and 1B. Similarly, a plane antenna array having approximate circular symmetry could be constructed as shown in FIG. 3 by substituting dipoles for the transducers shown and by using appropriate shading means and, also, a plane antenna array having square symmetry could be constructed as shown in FIG. 5 by the substitution of dipoles and the use of appropriate shading means.

With the substitution of dipoles for electroacoustic transducers and of shading means appropriate to dipoles, an antenna array shaded according to the present invention is subject to the same design limitations, such as requisite distance between elements and operating frequency, as a transducer array so shaded.

An antenna array shaded according to the present invention has a constant electric field, plane wave near-field which is analogous to the constant pressure, plane wave near-field that an electroacoustic transducer array has when shaded according to the present invention.

Thus, the present invention provides an antenna array which has a constant electric field plane wave near-field and an analogous electroacoustic transducer array which has a constant pressure, plane wave near-field. Furthermore, the present invention provides a method of calibrating an electroacoustic transducer from measurements made in its near-field.

Obviously many modifications and variations of the present invention are possible in the light of the above teachings. It is therefore to be understood that, within the scope of the appended claims, the invention may be practiced otherwise than as specifically described.

What is claimed and desired to be secured by Letters Patent of the United States is:

1. The method of obtaining data for the calibration of an electroacoustic transducer from measurements made in the near field of an acoustically transparent electroacoustic transducer array having a constant pressure, plane wave near-field region which comprises:

placing said transducer in said region;
operating said array in its transmitting mode;
operating said transducer in its receiving mode;
measuring the current driving said array when it is operating in its transmitting mode and the open-circuit output voltage produced by said transducer when it is operating in its receiving mode in response to the reception of compressional waves produced by said array;
operating said transducer in its transmitting mode;
operating said array in its receiving mode; and
measuring the current driving said transducer when it is operating in its transmitting mode and the open-circuit output voltage produced by said array when it is operating in its receiving mode in response to the reception of compressional waves produced by said transducer.

2. A method of obtaining data for the calibration of an electroacoustic transducer which has a beam axis from measurements made in the near-field of an acoustically transparent electroacoustic transducer array having a constant pressure, plane wave near-field region and a beam axis which comprises:

placing said transducer in said region;
aligning the beam axis of said transducer with the beam axis of said array;
operating said array in its transmitting mode;
operating said transducer in its receiving mode;
measuring the current driving said array when it is operating in its transmitting mode and the open-circuit output voltage produced by said transducer when it is operating in its receiving mode in response to the reception of compressional waves produced by said array;
operating said transducer in its transmitting mode;
operating said array in its receiving mode;
measuring the current driving said transducer when it is operating in its transmitting mode and the open-circuit output voltage produced by said array when it is operating in its receiving mode in response to the reception of compressional waves produced by said transducer.

3. The method of obtaining data for the determination of the far-field directivity of an electroacoustic transducer having a beam axis from measurements made in the near-field of an acoustically transparent electroacoustic transducer array having a constant pressure, plane near-field region and a beam axis which comprises:

placing said transducer in said region;

operating said array in its transmitting mode;
operating said transducer in its receiving mode;
rotating said transducer in such a manner that its beam axis is rotated through 360° in a plane which contains the beam axis of said array;
measuring the current driving said array; and
measuring the open-circuit output voltage produced by said transducer in response to the reception of compressional waves produced by said array and received by said transducer for a plurality of positions assumed by said transducer during its rotation.

4. A method of obtaining data for the calibration of an electroacoustic transducer, said method comprising the steps of:
providing an acoustically transparent transducer array;
shading said array transducers so that their sensitivities increase from the extremities toward the center of said array according to the coefficients of a summed binomial probability distribution function so that array has a constant pressure, plane wave near-field extending across the aperture of said array;
placing said electroacoustic transducer in said near-field region;
operating said array in its transmitting mode;
operating said electroacoustic transducer in its receiving mode; and
measuring the current driving said array when it is operating in its transmitting mode and the open-circuit output voltage produced by said electroacoustic transducer when it is operating in its receiving mode in response to the reception of compressional waves produced by said array.

5. The method of claim 4 wherein said summed binomial probability distribution function has the general formula $$\sum_{x=r}^{n} \binom{n}{r}(0.5)^n$$

where $n$ equals the number of independent binomial trials and $r=1, 2, 3 \ldots n$.

6. The method of claim 4 further including the steps of:
operating said electroacoustic transducer in its transmitting mode;
operating said array in its receiving mode; and
measuring the current driving said electroacoustic transducer when it is operating in its transmitting mode and the open-circuit output voltage produced by said array when it is operating in its receiving mode in response to the reception of compressional waves produced by said electroacoustic transducer.

7. The method of claim 5 further including the steps of:
operating said electroacoustic transducer in its transmitting mode;
operating said array in its receiving mode; and
measuring the current driving said electroacoustic transducer when it is operating in its transmitting mode and the open-circuit output voltage produced by said array when it is operating in its receiving mode in response to the reception of compressional waves produced by said electroacoustic transducer.

8. A method of obtaining data for the determination of the far-field directivity of an electroacoustic transducer having a beam axis, said method comprising the steps of:
providing an acoustically transparent transducer array;
shading said array transducers so that their sensitivities increase from the extremities toward the center of said array according to the coefficients of a summed binomial probability distribution function so that said array has a constant pressure, plane wave near-field extending across the aperture of said array;
placing said elecroacoustic transducer in said near-field region,
operating said array in its transmitting mode;
operating said transducer in its receiving mode;
rotating said electroacoustic transducer in such a manner that its beam axis is rotated through 360° in a plane which contains the beam axis of said array;
measuring the current driving said aray; and
measuring the open-circuit output voltage produced by said electroacoustic transducer in response to the reception of compressional waves produced by said array and received by said electroacoustic transducer for a plurality of positions assumed by said electroacoustic transducer during its rotation.

9. The method of claim 8 wherein said summed binomial probability distribution function has the general formula $$\sum_{x=r}^{n} \binom{n}{r}(0.5)^n$$

where $n$ equals the number of independent binomial trials and $r=1, 2, 3, \ldots n$.

References Cited

UNITED STATES PATENTS

| | | | |
|---|---|---|---|
| 2,999,225 | 9/1961 | Gregg et al. | 340—8 |
| 3,257,839 | 6/1966 | Vanhoesen et al. | 340—8 X |

RICHARD A. FARLEY, *Primary Examiner.*